(12) United States Patent
Zhao et al.

(10) Patent No.: US 11,930,499 B2
(45) Date of Patent: Mar. 12, 2024

(54) NETWORK MONITORING IN SERVICE ENABLER ARCHITECTURE LAYER (SEAL)

(71) Applicant: TENCENT AMERICA LLC, Palo Alto, CA (US)

(72) Inventors: Shuai Zhao, Pleasanton, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 256 days.

(21) Appl. No.: 17/499,673

(22) Filed: Oct. 12, 2021

(65) Prior Publication Data

US 2022/0330303 A1 Oct. 13, 2022

Related U.S. Application Data

(60) Provisional application No. 63/172,052, filed on Apr. 7, 2021.

(51) Int. Cl.
*H04W 72/20* (2023.01)
*H04W 8/18* (2009.01)
(Continued)

(52) U.S. Cl.
CPC ........... *H04W 72/20* (2023.01); *H04W 8/183* (2013.01); *H04W 24/02* (2013.01); *H04W 24/08* (2013.01);
(Continued)

(58) Field of Classification Search
CPC ....... H04W 4/70; H04W 24/10; H04W 60/00; H04W 60/02; H04W 68/00
See application file for complete search history.

(56) References Cited

U.S. PATENT DOCUMENTS

| 10,015,621 B2 * | 7/2018 | Kim | ........................ | H04W 4/70 |
| 10,382,925 B2 * | 8/2019 | Kim | ...................... | H04W 60/02 |

(Continued)

FOREIGN PATENT DOCUMENTS

| CN | 102685209 A | * | 9/2012 | | |
| JP | 2004166056 A | | 6/2004 | | |
| WO | WO-2019075317 A1 | * | 4/2019 | ......... | H04L 12/1836 |

OTHER PUBLICATIONS

S. P. Shah, B. J. Pattan, N. Gupta, N. D. Tangudu and S. Chitturi, "Service Enabler Layer for 5G Verticals," 2020 IEEE 3rd 5G World Forum (5GWF), Bangalore, India, 2020, pp. 269-274, doi: 10.1109/5GWF49715.2020.9221425. (Year: 2020).*

(Continued)

*Primary Examiner* — William D Cumming
(74) *Attorney, Agent, or Firm* — ARENTFOX SCHIFF LLP

(57) ABSTRACT

A method of a service enabler architecture layer (SEAL) can include receiving a monitoring event subscription request for network connection status information at a network resource management server in the SEAL from a vertical application layer (VAL) server. The monitoring event subscription request can indicate a target VAL user equipment (UE), a type of the network connection status information, and a timeout period indicating an amount of time lapsed after the monitoring event subscription request was transmitted. The requested network connection status information is not transmitted after the timeout period. The network connection status information of the target VAL UE can be obtained from a wireless network system. A network connection status information response message can be transmitted from the network resource management server in the SEAL to the VAL server. The network connection status (Continued)

information response message can include the network connection status information of the target VAL UE.

20 Claims, 7 Drawing Sheets

(51) Int. Cl.
*H04W 24/02* (2009.01)
*H04W 24/08* (2009.01)
*H04W 24/10* (2009.01)
*H04W 48/18* (2009.01)
*H04W 76/38* (2018.01)

(52) U.S. Cl.
CPC ........... *H04W 24/10* (2013.01); *H04W 48/18* (2013.01); *H04W 76/38* (2018.02)

(56) References Cited

U.S. PATENT DOCUMENTS

| | | | | |
|---|---|---|---|---|
| 11,041,383 | B2* | 6/2021 | Hao | G01N 33/241 |
| 11,144,411 | B2* | 10/2021 | Liao | H04L 9/50 |
| 11,338,043 | B2* | 5/2022 | Van Berkel | A61K 47/549 |
| 11,470,168 | B2* | 10/2022 | Ly | H04L 67/12 |
| 2012/0044990 | A1 | 2/2012 | Bivolarsky et al. | |
| 2017/0052831 | A1 | 2/2017 | Wu et al. | |
| 2017/0118667 | A1 | 4/2017 | Mattsson et al. | |
| 2018/0288592 | A1* | 10/2018 | Kim | H04W 60/00 |
| 2019/0394712 | A1 | 12/2019 | Ronneke et al. | |
| 2020/0149394 | A1* | 5/2020 | Hao | E21B 7/04 |
| 2020/0363425 | A1* | 11/2020 | Alley | G01N 33/6848 |
| 2021/0109825 | A1* | 4/2021 | Liao | H04L 9/085 |
| 2021/0211509 | A1* | 7/2021 | Ly | H04L 41/22 |
| 2022/0330303 | A1* | 10/2022 | Zhao | H04W 24/10 |
| 2023/0388748 | A1* | 11/2023 | Tangudu | H04W 68/00 |

OTHER PUBLICATIONS

3GPP TR 23.745 V1.4.0 (Mar. 2021), "3rd Generation Partnership Project; Technical Specification Group Services and System Aspects; Study on application layer support for Factories of the Future in 5G network; (Release 17)" (Year: 2021).*

English translation of CN102685209A Sep. 2023 (Year: 2023).*

International Search Report and Written Opinion dated Feb. 4, 2022 in International No. PCT/US 21/53392. 13 pgs.

Samsung, "Pseudo-CR on EN resolution for problematic UAV," 3GPP TSG-SA WG6 Meeting #42-e, e-meeting, Mar. 1-9, 2021, S6-210704, 8 pages.

* cited by examiner

NETWORK MONITORING IN SERVICE ENABLER ARCHITECTURE LAYER (SEAL)

INCORPORATION BY REFERENCE

This present disclosure claims priority to U.S. Provisional Application No. 63/172,052, "A Method for 3GPP UE to Query Network Connection Status When Using SEAL Architecture", filed on Apr. 7, 2021, which is incorporated by reference herein in its entirety.

TECHNICAL FIELD

The present disclosure describes embodiments generally related to a service enabler layer for supporting vertical applications operating over a wireless network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless communication systems are being designed with advanced built-in features to support enterprise segments or vertical industries such as health care, automotive, smart factories, mission-critical communications, and the like. Vertical application standards are being developed to enable rapid deployment of vertical services based on common services provided by wireless networks. A vertical domain can be an industry or a group of enterprises in which similar products or services are produced. A vertical application can provide services or functions useful in a specific vertical domain.

SUMMARY

Aspects of the disclosure provide a method of a service enabler architecture layer (SEAL). The method can include receiving a request for network connection status information (also referred to as a monitoring event subscription request for network connection status information) at a network resource management server in the SEAL from a vertical application layer (VAL) server. The request for the network connection status information can indicate a target VAL user equipment (UE), a type of the network connection status information, and a timeout period indicating an amount of time lapsed after the monitoring event subscription request was transmitted, wherein the requested network connection status information is not transmitted after the timeout period. The network connection status information of the target VAL UE can be obtained from a wireless network system through a network service exposure interface based on the request for the network connection status information. A network connection status information response message can be transmitted from the network resource management server in the SEAL to the VAL server. The network connection status information response message can include the network connection status information of the target VAL UE.

In an embodiment, the network connection status information corresponds to a monitoring event related to the target UE which the VAL server is interested in and is detected in the wireless network system based on a predefined condition. In an embodiment, the network connection status information includes one of a loss of connection of the target VAL UE, and a connection bandwidth of the target VAL UE to the wireless network system.

In an embodiment, the request for the network connection status information includes a subscription to the type of the network connection status information. In an embodiment, the subscription indicates a frequency for providing the network connection status information from the network resource management server to the VAL server.

In an embodiment, the network connection status information response message indicates an identity of the target VAL UE, and the network connection status information of the target VAL UE. In an embodiment, the network connection status information response message further indicates a timestamp corresponding to the network connection status information of the target VAL UE.

An embodiment of the method can further include in response to the received request for the network connection status information, transmitting a network connection status information request accept message from the network resource management server in the SEAL to the VAL server indicating the request for the network connection status information is authorized.

Aspects of the disclosure provide a non-transitory computer-readable medium storing instructions. The instructions, when executed by a processor, can cause the processor to perform the above method of the SEAL.

Aspects of the disclosure provide an apparatus of a SEAL. The apparatus can include circuitry configured to receive a request for network connection status information (also referred to as a monitoring event subscription request for network connection status information) at a network resource management server in the SEAL from a VAL server. The request for the network connection status information can indicate a target VAL user equipment (UE), a type of the network connection status information, and a timeout period indicating an amount of time lapsed after the monitoring event subscription request was transmitted, wherein the requested network connection status information is not transmitted after the timeout period. The network connection status information of the target VAL UE can be obtained from a wireless network system through a network service exposure interface based on the request for the network connection status information. A network connection status information response message can be transmitted from the network resource management server in the SEAL to the VAL server. The network connection status information response message can include the network connection status information of the target VAL UE.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Service Enabler Layer for Verticals

1. Service Enabler Architecture Layer (SEAL)

Embodiments of the disclosure implement a service enabler layer for supporting vertical applications (or verticals). The service enabler layer can be referred to as a service enabler architecture layer (SEAL) in this disclosure. The SEAL can provide a common set of capabilities (or services) used by multiple verticals to accelerate the development and deployment of vertical applications. For example, instead of developing auxiliary services specific to each vertical, commonly needed auxiliary services can be captured into the SEAL and shared by multiple vertical applications. Usage of all SEAL services by a vertical application can be optional. A vertical application can decide to use any subset of services from the SEAL.

2. Generic Functional Model for SEAL Services

In some embodiments, a functional model for SEAL can be organized into a generic SEAL service functional model and multiple specific SEAL service functional models. The generic SEAL service functional model can be used as a reference model for the specific SEAL service functional models. The generic functional model can include an on-network functional model and an off-network functional model. In various embodiments, the SEAL services provided to support the vertical application layer can include location management, group management, configuration management, identity management, key management, network resource management, and the like.

Figure 1:
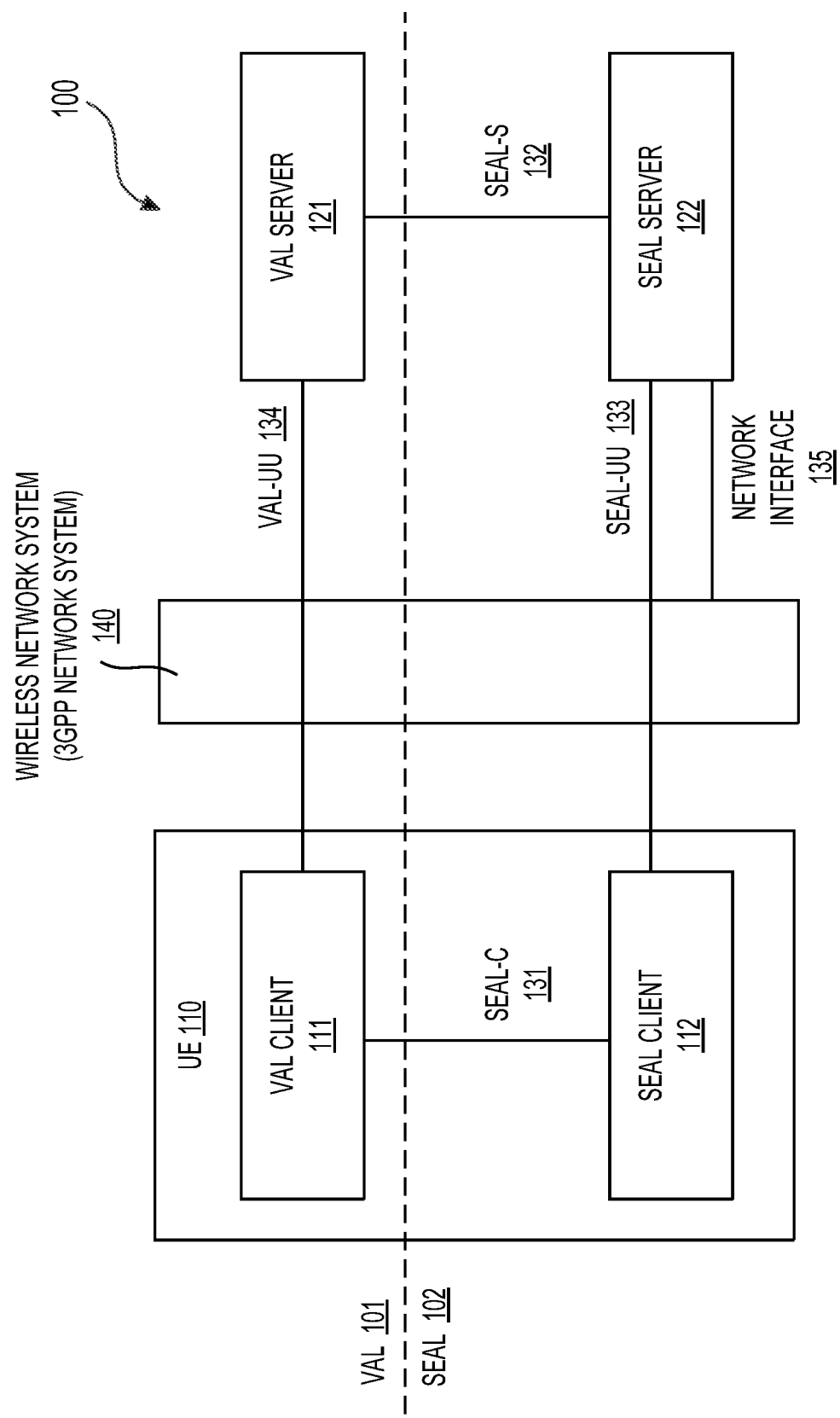
FIG. 1 shows a generic on-network functional model (100) according to an embodiment of the disclosure.

FIG. 1 shows a generic on-network functional model (100) according to an embodiment of the disclosure. The model (100) can include four types of functional entities: a vertical application layer (VAL) client (111), a VAL server (121), a SEAL client (112), and a SEAL server (122). The number of each type of functional entities in the model (100) can be one or more than one. The VAL client and the VAL server entities can belong to a VAL (101). The SEAL client and the SEAL server entities can belong to a SEAL (102). The VAL client (111) and the SEAL client (112) can be included in a user equipment (UE) (110). The model (100) further includes a wireless network system (140) (such as a Third Generation Partnership Project (3GPP) network system). The elements can be coupled together as shown in FIG. 1.

In the VAL (101), the VAL client (111) communicates with the VAL server (121) over a VAL-UU reference point (134) corresponding to a VAL-UU interface. In an example, the VAL-UU interface supports both unicast and multicast delivery modes.

The SEAL (102) offers various services to the VAL (101). The SEAL client(s) communicates with the SEAL server(s) over a SEAL-UU reference point(s) (133) corresponding to a SEAL-UU interface. The SEAL-UU interface supports both unicast and multicast delivery modes. The SEAL client(s) provides the service enabler layer support functions to the VAL client(s) over a SEAL-C reference point (131) (corresponding to a SEAL-C interface). The VAL server(s) communicates with the SEAL server(s) over a SEAL-S reference point(s) (corresponding to a SEAL-S interface). The SEAL server(s) (122) may communicate with the underlying 3GPP network system (140) using a respective 3GPP interface (135) specified by the 3GPP network system.

For a specific service (such as the location management service), a specific SEAL client and a specific SEAL server along with their specific SEAL-UU reference point and the specific network interface of the 3GPP network system can form or belong to a specific on-network functional model.

In some embodiments, to support distributed SEAL server deployments, a SEAL server may interact with another SEAL server for the same SEAL service over a so-called SEAL-E reference point (not shown in FIG. 1). A SEAL server can interact with another SEAL server for inter-service communication over a so-called SEAL-X reference point (not shown in FIG. 1). A SEAL server may interact with a VAL user database for storing and retrieving a user profile over a VAL-UDB reference point.

In various embodiments, functional entities in a VAL system (for example, including the VAL 101 and the SEAL 102) can provide application control and media-specific functions to support one or more VAL services. In the FIG. 1 example, the VAL client (111) (e.g., a vehicle-to-everything (V2X) client) can provide client-side functionalities corresponding to a vertical application (e.g., a V2X application). The VAL client (111) can support the vertical application's interactions with the SEAL client(s) (112). The VAL server (121) (e.g. a V2X application server) can provide server-side functionalities corresponding to the vertical application.

In the FIG. 1 example, the SEAL client (112) can provide client-side functionalities corresponding to a specific SEAL service (e.g., location management, network resource management, or the like). The SEAL client (112) can support interactions with the VAL client(s) (111). The SEAL client can also support interactions with a corresponding SEAL client between the two UEs. The SEAL server (122) can provide server-side functionalities corresponding to the specific SEAL service. The SEAL server (122) can support interactions with the VAL server(s) (121). The SEAL server can also support interactions with the corresponding SEAL server in distributed SEAL deployments.

It is noted that the functional entities in the model (100) can be implemented in various ways in different embodiments. For example, the functional entities can be implemented in a distributed manner or a centralized manner. The functional entities can be implemented as software or a combination of software and hardware.

In the FIG. 1 example, the VAL user database (not shown) can contain information of user profiles associated with a VAL service provided by a VAL service provider. Typically, each VAL service may have a corresponding user database, such as a mission critical push to talk (MCPTT) user database, a mission critical video (MCVideo) user database, and a mission critical data (MCData) user database.

In some embodiments, the interactions related to the VAL (101) support functions between the VAL client (111) and the VAL server (121) are supported by the VAL-UU reference point (134). In an example, this reference point (134) is an instance of a Uu reference point as described in 3GPP TS 23.401 and 3GPP TS 23.501. In some embodiments, the interactions related to VAL support functions between the VAL clients of two UEs can be supported by a VAL-PC5 reference point (not shown). For example, this reference point can be an instance of a PC5 reference point as described in 3GPP TS 23.303.

In some embodiments, the interactions between a SEAL client (112) and the corresponding SEAL server (122) are supported by a SEAL-UU reference point (133). The specific SEAL service reference point corresponding to the SEAL-UU (133) can be specified in a specific SEAL service functional model. In some embodiments, the interactions between the SEAL clients of two VAL UEs can be supported by a SEAL-PC5 reference point (not shown). The specific SEAL service reference point corresponding to the SEAL-PC5 can be specified in a specific SEAL service functional model.

In some embodiments, the interactions between the VAL client(s) (111) and the SEAL client(s) (112) within the VAL UE (110) are supported by a SEAL-C reference point (131). The specific SEAL service reference point corresponding to the SEAL-C(131) can be specified in a specific SEAL service functional model.

In some embodiments, the interactions between the VAL server (121) and the SEAL server (132) are supported by a SEAL-S reference point (132). A specific SEAL service reference point corresponding to the SEAL-S (132) can be specified in the specific SEAL service functional model.

In some embodiments, the interactions between the SEAL servers of the same type (e.g., providing a same type of SEAL service) are supported by a SEAL-E reference point (not shown). The specific SEAL service reference point corresponding to the SEAL-E is specified in the specific SEAL service functional model.

In some embodiments, the interactions between the SEAL servers of different types can be supported by a SEAL-X reference point. Examples of specific reference points corresponding to the SEAL-X reference points can include a reference point SEAL-X1 between a key management server and a group management server, a reference point SEAL-X2 between a group management server and a location management server.

A reference point VAL-UDB exists between a VAL user database and a SEAL server. The reference point VAL-USB can be used for storing the user profile data in a specific VAL user database and obtaining the user profile from the specific VAL user database for further configuration in a UE.

3. Identities

In various embodiments, different identities can be configured and used in a VAL system developed based on the model (100). In some embodiments, a VAL user can present a user identity (User ID) to an identity management server in the SEAL (102) during a user authentication transaction to provide an identity management client a means for VAL service authentication. In general, since identity management is a common SEAL service, the identity management server uses a set of credentials (e.g. biometrics, secureID, username/password) that may not necessarily be tied to a single VAL service. The user credentials uniquely identify the VAL user to the identity management server. As an example, the specific security and authentication mechanisms required in order to use the user ID is specified in 3GPP TS 33.434.

In some embodiments, a VAL user ID is a unique identifier within the VAL service that represents the VAL user. For example, the VAL user ID may be a URI. The VAL user ID is used for authentication and authorization purposes for providing the VAL service towards the VAL user via a VAL UE. The VAL user ID also indicates a VAL service provider with which the VAL user has a VAL service agreement. The VAL user may have a VAL service agreement with a VAL service provider and thus have obtained a unique VAL user ID per a VAL service provider. The VAL user ID can be used to access a SEAL service.

In some embodiments, a VAL UE ID is a unique identifier within a VAL service that represents the VAL UE. For example, the VAL UE ID for a V2X service is mapped to a Station ID as specified in ETSI TS 102 894-2. The VAL UE ID is used to address the VAL UE in order to send VAL messages.

In some embodiments, a VAL service ID is a unique identifier that represents a VAL service. A VAL server provides a list of VAL services towards VAL users or VAL UEs. Each VAL service is uniquely identified by a VAL service ID, which is an identifier of the VAL application providing that VAL service. The VAL service ID can be used for policy mapping, QoS handling for VAL communication and VAL message distribution. For example, an identifier of a V2X service, e.g. ITS-AID or PSID specified in ETSI TS 102 965 and ISO TS 17419, can be used as a V2X service ID.

In some embodiments, a VAL group ID is a unique identifier within a VAL service that represents a set of VAL users or VAL UEs according to the VAL service. The set of VAL users may belong to the same or different VAL service providers. The VAL group ID indicates the VAL application server where the group is defined.

In some embodiments, a VAL system ID is a globally unique identifier representing a VAL system. In some embodiments, a VAL Stream ID is an identity used by the VAL server to identify a VAL stream.

4. Application of Functional Model to Deployments

In various embodiments, the SEAL architecture as described above can support deployments in which SEAL services are deployed within and/or outside a public land mobile network (PLMN) network. The SEAL architecture can also support centralized as well as distributed deployments of vertical applications. A mobile network operator (MNO) can leverage an appropriate deployment model according to need and that is suitable to its business.

A deployment model can involve multiple entities, such as VAL users, VAL service providers, SEAL providers, and PLMN operators. As an example, in a possible deployment model, SEAL server(s) can be deployed within a PLMN operator domain, and vertical application servers can be deployed in a VAL service provider domain. SEAL servers can also interact with another SEAL server of a same SEAL service, which is deployed in a different PLMN operator domain, using a SEAL-E interface.

There can be possibilities of multiple business relationships among entities involved in a deployment. Based on a service-specific agreement, VAL Users belong to a VAL service provider domain. A VAL service provider and a home PLMN operator may belong to a same organization. The VAL service provider can have a service agreement with a SEAL service provider. It is also possible that the VAL service provider, the SEAL service provider, and the home PLMN operator belong to the same organization. The VAL service provider and the home PLMN operator may have a service agreement if they do not belong to the same organization.

5. V2X Vertical Application Based on SEAL

In an embodiment, a V2X vertical application is developed based on SEAL services. The SEAL can support multiple SEAL services. Each SEAL service can support multiple processes. Typically, a SEAL client will not initiate a process itself. In order for the SEAL client to start a process, the V2X vertical application needs to provide triggers and parameters related to the process to the SEAL client.

For example, a V2X application-level functional model is defined in 3GPP TS 23.286. As defined, a V2X application enabler (VAE) layer provides VAE capabilities for a V2X application specific layer. The VAE layer utilizes SEAL services. A VAE client can act as a VAL client for interactions with a SEAL client as specified by the SEAL architecture. A VAE server can act as a VAL server for interactions with a SEAL server as specified by the SEAL architecture.

The V2X application layer can provide a group joining strategy and a group leader for each group. The VAE client and the VAE server use a SEAL group management service for group management operations. The V2X application layer is responsible for deciding when to create, modify or delete groups. Before a V2X UE starts to receive a V2X service from the V2X application layer, the VAE client and the VAE server can use the SEAL configuration management service to provide configurations to the V2X UE. When the V2X UE has received the V2X service from the V2X application layer, the VAE client and the VAE server can also use the SEAL configuration management service to provide configuration updates to the V2X UE.

The VAE client and VAE server can use a SEAL location management service to manage the location information of a V2X UE and update location information to the V2X application layer. The VAE client and the VAE server can use a SEAL identity management service to authenticate and authorize the V2X UE for using a V2X application server. The VAE client and the VAE server can use a SEAL network resource management service to establish, modify and switch between different types of bearers.

The VAE server can also use a SEAL API to use SEAL services to enable different functions or services of the V2X application. For example, to create a group for a V2X application, the VAE server can invoke a create service operation of the group management API on a GM-S reference point. A group management server can create a group document and notify the VAE server of the newly created group information.

In various embodiments, multiple vertical applications can use SEAL services at the same time. For example, two vertical applications V2X and MCPTT can use SEAL services. A SEAL server can interface with both vertical application servers. In addition, each vertically specific UE can include a SEAL client that provides services to vertical application clients. The two SEAL clients interact with the SEAL server to provide support to the two vertical applications.

II. Network Resource Management Service

1. Functional Model for Network Resource Management

Figure 2:
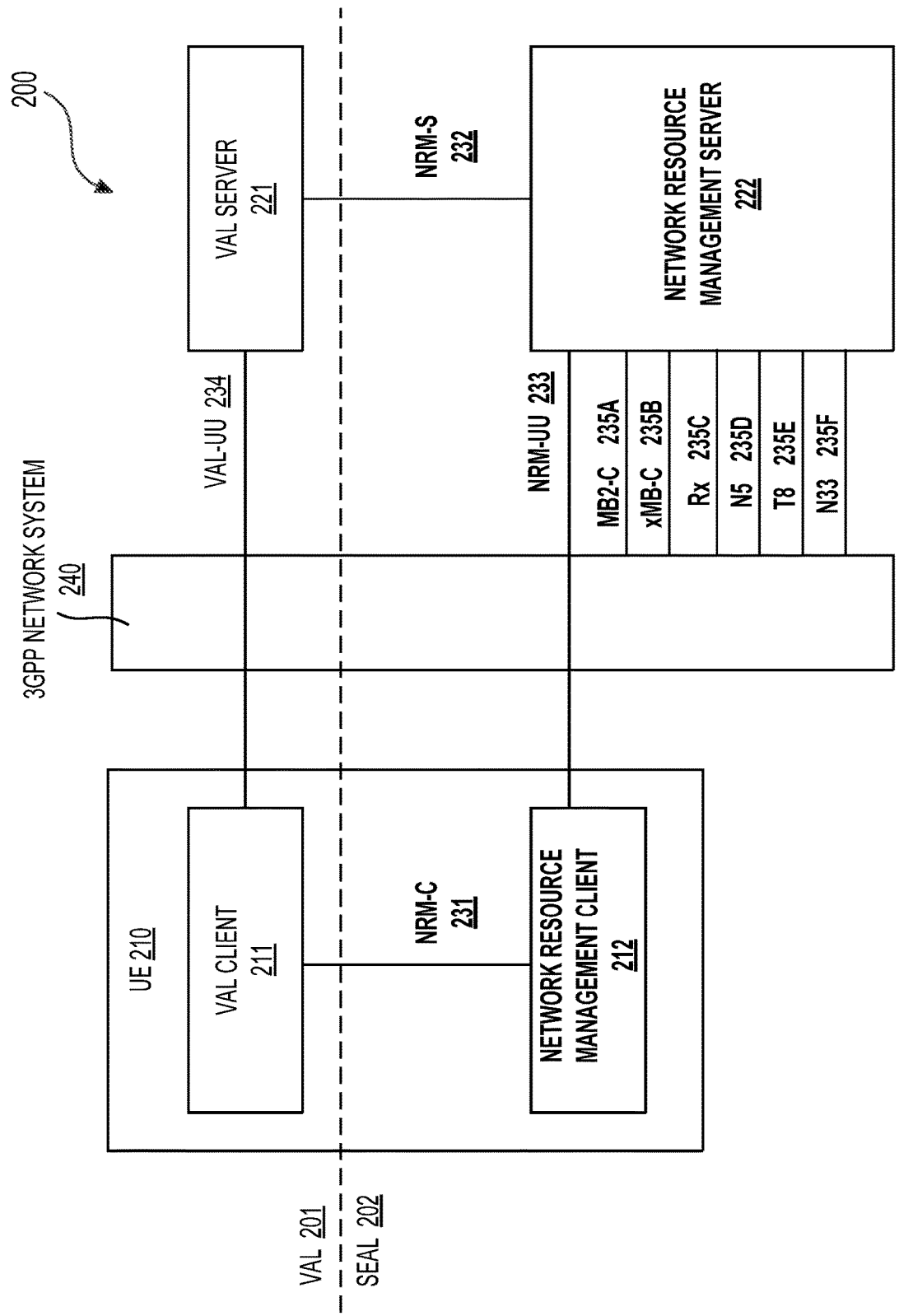
FIG. 2 shows an exemplary on-network network resource management functional model (200) according to some embodiments of the disclosure.

FIG. 2 shows a functional model (200) for the network resource management SEAL service according to some embodiments of the disclosure. The functional model (200) can be based on the generic functional model (100) shown in FIG. 1. The functional model (200) can include a VAL client (211), a VAL server (221), a network resource management client (212), and a network resource management server (222). The VAL client (211) and VAL server (221) can be included in a VAL (201). The network resource management client (212) and the network resource management server (222) can be included in a SEAL (202). The VAL client (211) and the network resource management client (212) can reside in a VAL UE (210). Also, the functional model (200) can further include a 3GPP network system (240).

In some embodiments, the network resource management client (212) communicates with the network resource management server (222) over a reference point (233) denoted NRM-UU. "NRM" stands for "network resource management". The network resource management client (212) provides support for network resource management functions to the VAL client (211) over a reference point (231) denoted NRM-C. The VAL server (221) communicates with the network resource management server (222) over a reference point (232) denoted NRM-S. The VAL client (211) communicates with the VAL server (221) over a reference point (234) denoted VAL-UU. The VAL UE (210) can communicate with the 3GPP network system (240) over a UU interface (not shown) as specified in 3GPP standards for example.

In some embodiments, the network resource management server (222) can communicate with the 3GPP network system (240) via one or more interfaces to utilize various services provided by the 3GPP network system (240). In an example, the network resource management server (222) can communicate with a broadcast multicast service center (BM-SC) in the 3GPP network system (240) via a MB2-C reference point (235A) or an xMB-C reference point (235B) to obtain and control multicast resources from the underlying 3GPP network system (240). In an example, the network resource management server (222) communicates with a policy and charging rules function (PCRF) in the 3GPP network (240) via a Rx reference point (235C) or communicates with a policy control function (PCF) in the 3GPP network system (240) via an N5 reference point (235D) to control unicast resources from the underlying 3GPP network system (240).

In an example, the network resource management server (222) communicates with a service capability exposure function (SCEF) via a T8 reference point (235E) or communicates with a network exposure function (NEF) via an N33 reference point (235F) to perform event monitoring procedures from the underlying 3GPP network system (240). In an example, the network resource management server (222) interacts with an NEF via the N33 reference point (235F) to obtain QoS monitoring information from the 3GPP network system (240). Examples of the above functions and reference points can be found in related 3GPP standards.

In some embodiments, there can be multiple VAL clients in the VAL UE 210 and multiple VAL severs. These functional entities can utilize network resource management services provided by the network resource management client (212) and the network resource management server (222). In addition, in some embodiments, other types of network systems (standardized or non-standardized) other than the 3GPP network system (240) are utilized in a VAL system implementing the functional model (200). For example, those various types of network systems, in the place of the 3GPP network system (240), can provide wireless connections to VAL UEs for communicating with VAL servers or network resource management servers (222) or expose capabilities to serve the above SEAL (202) and VAL (201).

In contrast to the on-network model (200) shown in FIG. 2, an off-network functional model of the network resource management SEAL service can include a first UE and a second UE. The two UEs can communicate over a PC5 reference point or a PC5 interface. For example, each UE can include one or more VAL clients in a VAL. The VAL clients of the first UE and the second UE can communicate over a VAL-PC5 reference point. Each UE can include a network resource management client. The network resource management clients of the first UE and the second UE can communicate over an NRM-PC5 reference point.

In some embodiments, the network resource management client (212) acts as an application client for the management of network resources. The network resource management client (212) interacts with the network resource management server (222). The network resource management server (222) provides for management of 3GPP system network resources (e.g. unicast, multicast) and monitoring events notification to support VAL applications. The network resource management server (222) also supports interactions with a corresponding network resource management server in distributed SEAL deployments. In an embodiment, the network resource management server's role is assumed by a VAL server in a deployment. In such a case, the VAL server performs the procedures for network resource management in place of the network resource management server.

In some embodiments, the interactions related to network resource management functions between the network resource management client (212) and the network resource management server (222) are supported by an NRM-UU reference point. This reference point utilizes a Uu reference point as described in 3GPP TS 23.401 and 3GPP TS 23.501. In some embodiments, the interactions related to network resource management functions between the network resource management clients located in different VAL UEs are supported by an NRM-PC5 reference point. This reference point utilizes PC5 reference point as described in 3GPP TS 23.303.

In some embodiments, the interactions related to network resource management functions between the VAL server (221) and the network resource management server (222) are supported by an NRM-S reference point. This reference point can be an instance of a CAPIF-2 reference point as specified in 3GPP TS 23.222. In some embodiments, the interactions related to network resource management functions between the network resource management servers in a distributed deployment are supported by an NRM-E reference point.

In some embodiments, a reference point MB2-C supports the control plane interactions between the network resource management server (222) and a BM-SC and is specified in 3GPP TS 29.468. In some embodiments, a reference point xMB-C supports the control plane interactions between the network resource management server (222) and a BM-SC and is specified in 3GPP TS 26.348. In some embodiments, a reference point Rx supports the interactions between the network resource management server (222) and a PCRF and is specified in 3GPP TS 29.214.

In some embodiments, a reference point N5 supports the interactions between the network resource management server (222) and a PCF for example as specified in 3GPP TS 23.501. In some embodiments, a reference point N33 supports the interactions between the network resource management server (222) and an NEF for example as specified in 3GPP TS 23.501. In some embodiments, a reference point T8 supports the interactions between the location management server (222) and an SCEF for example as specified in 3GPP TS 23.682.

2. Exemplary Network Connection Status Monitoring Processes 2.1 Event Monitoring In some embodiments, an event monitoring scheme is used for providing network connection status monitoring services as part of the network resource management SEAL service. For example, a VAL server can utilize a network resource management server to monitor events related to VAL UEs being served by the VAL server. Based on a monitoring event subscription request from the VAL server, the network resource management server can subscribe to multiple core network services from an underlying wireless network system to fetch the required events related to the multiple VAL UEs served by the VAL server. The network resource management server can then report the obtained events to the VAL server.

In some embodiments, to monitor and report monitoring events related to VAL UEs from a 3GPP core network, a network resource management server can use monitoring events procedures specified in 3GPP TS 23.502. To monitor and report analytics events related to the VAL UEs, a network resource management server can use related procedures such as those specified in 3GPP TS 23.288.

Figure 3:
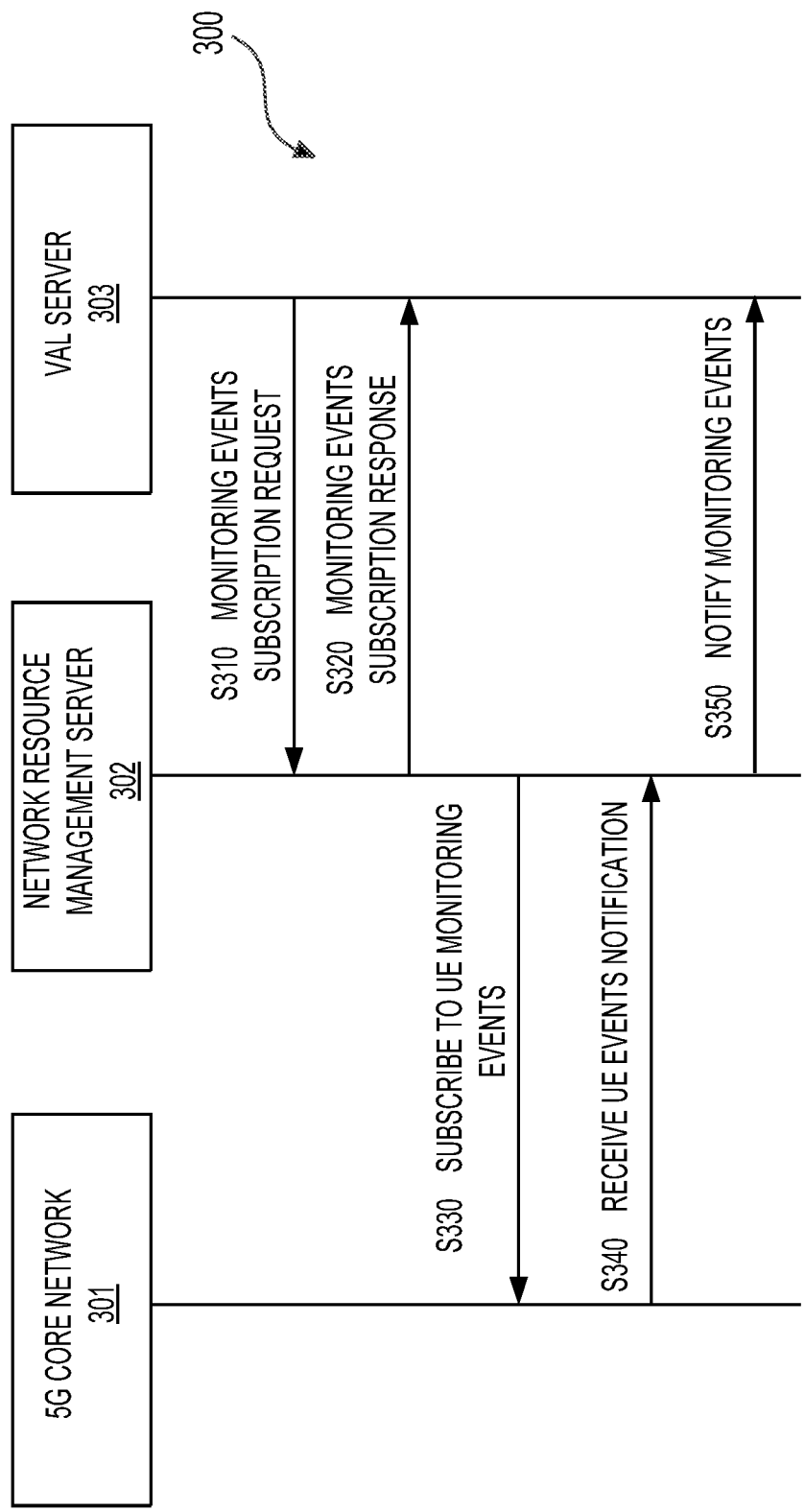
FIG. 3 shows an event subscription and notification process (300) according to some embodiments of the disclosure.

FIG. 3 shows an event subscription and notification process (300) according to some embodiments of the disclosure. The process (300) can be performed among a 5G core network (301), a network resource management server (302), and a VAL server (303). During the process (300), the VAL server (303) subscribes to services of the network resource management server (302) to monitor the events related to one or more VAL UEs (not shown) served by the VAL server (303). Based on a VAL server request, the network resource management server (302) consumes the relevant core network services to receive the events related to the VAL UEs. The process (300) can start from (S310).

At (S310), the VAL server (303) sends a monitoring events subscription request to the network resource management server (302) to request the network resource management server (302) to monitor events related to the VAL UEs according to the subscription request.

The monitoring events subscription request can include the information related to the events that the VAL server is interested in. In some embodiments, the monitoring events subscription request can include one or more of the following information elements: (1) a list of VAL users or VAL UEs for which the events monitoring is requested. (2) A list of monitoring and/or analytics events that the VAL server is interested in. In an embodiment, for each of the listed VAL users or VAL UEs, a list of monitoring and/or analytics events is provided. In an embodiment, a common list of monitoring and/or analytics events is provided for the listed VAL users or VAL UEs. (3) A timeout period for transmitting a subscription response from the network resource management server (302) to the VAL server (303). In an example, when a monitoring events subscription response is not received at the VAL server (303) from the network resource management server (302) during the timeout period since the transmission of the event monitoring events subscription request, the VAL server (303) can deem the subscription request is failed or denied. In an example, the timeout period is used to specify a period after which the requested monitoring events subscription is ended.

In some embodiments, the monitoring events subscription request can include information listed in Table 1 below.

TABLE 1

| Information element | Status | Description |
| --- | --- | --- |
| Identities list | M | List of VAL users or VAL UEs for which events monitoring is requested. |
| Event details | O | List of monitoring and analytics events that the VAL server is interested in. |
| Timeout | O | A timeout period when subscription response is not received. |

In Table 1, "M" denotes "mandatory", and "O" denotes "optional".

At (S320), the network resource management server (302) can check if the VAL server (303) is authorized to initiate the monitoring events subscription request. If authorized, the network resource management server (302) can respond with a monitoring events subscription response message indicating a successful subscription status to the VAL server (303). The monitoring events subscription response message can include related subscription information to confirm the monitoring events subscription. If not authorized, the network resource management server (302) can respond with a monitoring events subscription response message indicating the subscription request is denied.

In some embodiments, the monitoring events subscription response can include information listed in Table 2 below.

TABLE 2

| Information element | Status | Description |
| --- | --- | --- |
| Subscription status | M | It indicates the subscription result. |

At (S330), based on the events of interest information in the events monitoring subscription request message at (S310), the network resource management server (302) can subscribe to UE monitoring events and/or UE analytics events for the set of UEs (VAL UEs) listed in the monitoring events subscription request from the 5G core network (301).

Examples of monitoring events can include loss of connectivity, UE reachability, location reporting, roaming status, communication failure, number of UEs present in a geographical area, and the like. Examples of analytics events can include UE mobility analytics, UE communication analytics, expected UE behavioral parameters related network data analytics, abnormal behavior related network data analytics, and the like.

In some embodiments, the network resource management server (302) performs the subscription of the UE monitoring events based on procedures specified in 3GPP TS 23.502. For example, a network exposure function can be employed to support external exposure of capabilities of network functions. The external exposure can be categorized as monitoring capability, provisioning capability, policy/charging capability, network status reporting capability and analytics reporting capability. The monitoring capability is for monitoring of specific events for UEs in a 5G system and making such monitoring events information available for external exposure via the NEF. For example, means for configuring specific events, event detection, and event reporting to a requested party are provided. A list of monitoring events and related detection criteria are specified in 3GPP 23.502.

In some embodiments, the network resource management server (302) performs the subscription of the UE analytics events. The subscription can be performed based on procedures specified in 3GPP TS 23.288. For example, one or more network data analytics functions (NWDAFs) can be employed to support data collection based on subscription to events provided by a data consumer, such as the network resource management server (302). Analytics information can be either statistical information of past events or predictive information.

While the 5G core network (301) is used as an example in the FIG. 3 example, other types of wireless or wired network systems can be used to provide support to the network resource management server (302) for monitoring related events in some embodiments.

At (S340), the 5G core network (301) can send subscribed events of the VAL UEs in a VAL UE monitoring events notification to the network resource management server (302) according to the monitoring events subscription of (S330). The network resource management server (302) accordingly receives the VAL UE monitoring events notification from the 5G core network (301).

At (S350), the network resource management server (302) can notify the VAL server (303) about the events related to the VAL UEs in a notify monitoring events message. In an embodiment, when multiple events are to be notified, the network resource management server (302) can aggregate the notifications and send them to the VAL server (303).

In some embodiments, the notify monitoring events message can include one or more of the following information elements: (1) A list of events and related VAL UE(s). Each entry in the list can include (i) a VAL UE which the events are related to, and (ii) a list of monitoring and/or analytics events related to the respective VAL UE. (2) Optionally, a timestamp corresponding to each of listed monitoring and analytics events.

In some embodiments, the timestamp in the notify monitoring events message can take one of several different time formats, such as ISO 8610 (e.g., yyyy-month-dayTHH:MM:SS), RFC 1123 (e.g., Monday, DD Mon YYYY HH:MM:SS TimeZone), coordinated universal time (UTC: yyyy-mn-ddTHH:MM:SS), and the like.

In some embodiments, the notify monitoring events message can include information listed in Table 3 below.

TABLE 3

| Information element | Status | Description |
| --- | --- | --- |
| Event Details | | List of events related to VAL UE(s). |
| >identity | M | VAL UE which the events are related to. |
| >events | M | List of monitoring and analytics events related to the VAL UE. |
| Timestamp | O | The timestamp for the monitoring and analytics events |

The process (300) can terminate after (S350).

In some embodiments, an application programming interface (API) is employed for the monitoring events subscription and notification process (300). The API is referred to as an events monitoring API. In an example, the events monitoring API defines two API operations: a subscribe-monitoring-events API operation for subscription to monitoring events and a notify-monitoring-events API operation for notifying a VAL server with monitoring events related to a VAL UE(s).

For example, the VAL server (303) can be a consumer of the subscribe-monitoring-events API operation. Corresponding to (S310) and (S320) of the process (300), the information elements in the monitoring events subscription request can be used as an input to the subscribe-monitoring-events API operation, while the information elements in the monitoring events subscription response can be used as an output to the subscribe-monitoring-events API operation.

In another example, the VAL server (303) can be a consumer of the notify-monitoring-events API operation. Corresponding to (S350) of the process (300), the information elements in the notify monitoring events message can be used as an input to the notify-monitoring-events API operation.

2.2 Network Connection Status Monitoring

In some embodiments, a network resource management client or a VAL server in a VAL system can be configured to provide network connection status monitoring functions. The network connection status monitoring functions can be performed in real time in some embodiment. For example, a monitor network connection status of VAL UEs or VAL users of the VAL system can be provided based on network connection status monitoring services provided by a network resource management server. It may be vital for some VAL services to monitor the network connection status at all time. For example, loss of connectivity may be fatal for certain vertical services.

Figure 4:
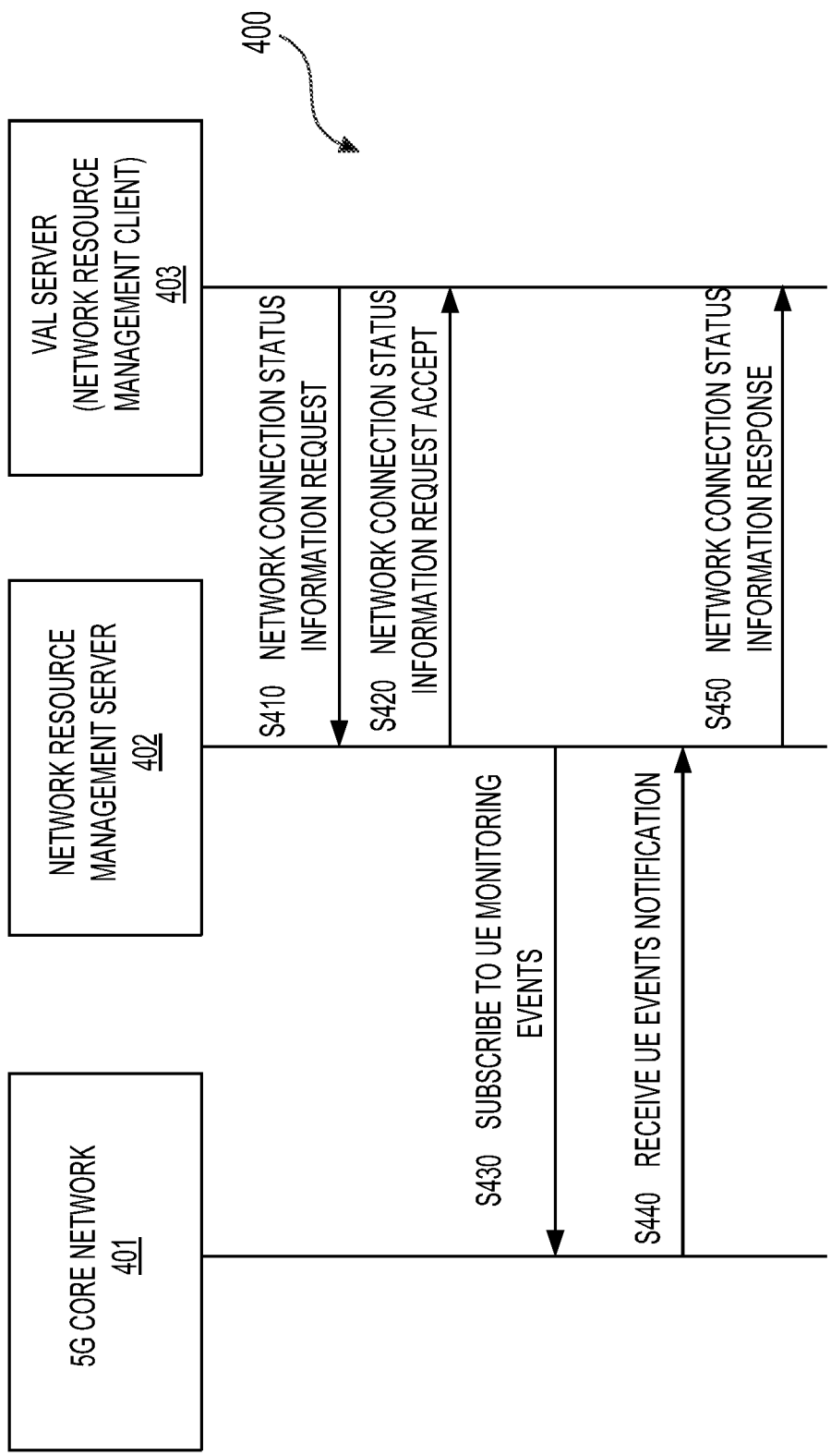
FIG. 4 shows a network connection status monitoring process (400) according to some embodiments of the disclosure.

FIG. 4 shows a network connection status monitoring process (400) according to some embodiments of the disclosure. The process (400) can be performed among a VAL server (403), a network resource management server (402), and a 5G Core Network (401). While the VAL server (403) is used to explain the process (400) in FIG. 4, a network resource management client residing in a VAL UE in other embodiments can also be configured to perform the process (400) in place of the VAL server (403) to monitor network connection status of other VAL UEs. Also, other types of wireless or wire network other than 3GPP network systems may be used to support the process (400).

In the network connection status monitoring process (400), the VAL server (403) can send a request for network connection status information of target VAL UEs to the network resource management server (402). In response, the network resource management server (402) can report network connection status of the target VAL UEs to the VAL server (403) according to the request. The process (400) can start from (S410).

At (S410), a network connection status information request message can be transmitted from the VAL server (403) to the network resource management server (402). The network connection status information request (also referred to as a monitoring event subscription request for network connection status information) can indicate one or more target VAL UEs for which the network connection status information is requested. For example, identities of VAL UEs or VAL users defined at a VAL can be used to identify the target UEs.

In some embodiments, the network connection status information request may indicate what types of network connection status are to be monitored. The types of network connection status to be monitored can include loss of connection, connection bandwidth, UE reachability, location reporting, protocol data unit (PDU) session status, and/or the like.

In some embodiments, the network connection status information request may additionally or optionally indicate how each type of network connection status is to be monitored and reported. The request can include a subscription in some embodiments. In an example, the network connection status information request may specify a frequency (or pulling frequency) for periodically reporting a current status of each type of to-be-monitored network connection status from the network resource management server (402).

In an example, the network connection status information can be event based. The event can be related to bandwidth and/or connection testing events. In an embodiment, the event can be time based such as in response to a query or frequency of a subscription. In some embodiments, the request may indicate a certain condition and when triggered, the respective network connection status is reported. For example, the conditions can be when a VAL UE loses connection, when a VAL UE changes its PDU session, when a UE leaves or enters a certain area, and the like. Such network connection status changes can be referred to as events in some embodiments. For example, a set of network connection status events and associated trigger or detection conditions can be predefined. A list of such predefined events can be included in the network connection status information request and provided from the VAL server (403) to the (network resource management server (402).

In some embodiments, the network connection status information request may indicate an identity of one or more an entities. The one or more entities can include a VAL server (e.g., the VAL server (403) in the FIG. 4 example), the identity of a VAL user, and/or a VAL UE. In an embodiment, the one or more entity can include an entity performing the request. In an embodiment, the one or more entity includes a VAL user or VAL UE for which monitoring (e.g., event monitoring) is requested.

In some embodiments, the network connection status information request may further indicate which service is requesting the network connection status information. For example, the VAL server (403) may operate and provide multiple services corresponding to a particular vertical application. The information of which service is requesting the network connection status information can help to address the target service at the VAL server (403) in some examples.

In some embodiments, the network connection status information request may further indicate a timeout period. The timeout period can be for transmitting a response from the network resource management server (402) to the VAL server (403). In an example, when a network connection status information request accept message is not received at the VAL server (403) from the network resource management server (402) during the timeout period since the transmission of the network connection status information request, the VAL server (403) can deem the request is failed or denied. In an example, the timeout period is used to specify a period after which transmission of the requested network connection status information is ended. The network resource management server (402) can stop providing network status monitoring report to the VAL server (403).

In an embodiment, the network connection status information request can include one or more of the following information elements in Table 4.

TABLE 4

| Information element | Status | Description |
| --- | --- | --- |
| Requester Identity | M | The identity of the entity (e.g., NRM-C or VAL server) sending the request. |
| VAL user ID or VAL UE ID | M (NOTE) | The identity of the VAL user(s) or VAL UE(s), of which the network connection status is requested. |
| VAL services requested | M | Service(s) for which the network connection request is sent (the requested network connection status includes bandwidth, connection testing, and the like). |

TABLE 4-continued

| Information element | Status | Description |
|---|---|---|
| Pulling Frequency | O | The indication of how often the network status pulling from the network resource management client is requested. The default value can be 0, representing no pulling repetition. For a numerical value other than 0, the unit can be second, minutes, etc. |
| Timeout | O | A timeout period when response is not received. |

NOTE:
Either of the information elements should be present.

In an embodiment, if the information element of "VAL services requested" in Table 4 is not present, the network connection status can be requested for all existing running VAL services on the client side.

At (S420), the network resource management server (402) can transmit a network connection status information request accept message to confirm or deny the network connection status information request of the VAL server (403). For example, the network resource management server (402) may check if the VAL server (403) has authorization to request the respective network connection status. In an example, the authorization can be specific for different types of network connection status.

(S430) and (S440) can be performed similarly as (S330) and (S340) to obtain network connection status information from the underlying 5G core network (401) by the network resource management server (402). It is noted that the monitoring events based subscription and notification operations described herein are merely examples for a SEAL obtaining network connection status information from an underlying network system. There can be various ways to obtain the desired network connection status information in various examples. For example, the network resource management server (402) may query an underlying network system at any time or periodically to obtain a type of network connection status.

At (S450), a network connection status information response message can be transmitted from the network resource management server (402) to the VAL server (403) to report network connection status information of target VAL UEs. For example, a list of VAL UEs can be indicated in the network connection status information response, for example, by listing identities of the VAL UEs. The list VAL UEs can be a full set or a subset of the target VAL UEs indicated in the network connection status information request of (S410). For each listed VAL UE, network connection status information can be provided.

In some embodiments, the network connection status information of a target VAL UE in the response message can be a current status of the target VAL UE. For example, the network resource management server (402) may query the underlying 5G core network periodically or in response to the network connection status information request to obtain the information. In some embodiments, the network connection status information of a target VAL UE in the response message can be an event related with the target VAL UE. For example, the event is detected by the underlying 5G core network (401).

In some embodiments, the network connection status information response message can further include a timestamp, for example, corresponding to each piece of network connection status information of a particular target VAL UE. For example, for a current network connection status, a timestamp can be provided to indicate a timing when the respective status information is obtained. For a detected event, a timestamp can be provided to indicate a timing when the respective event takes place or is detected.

In some embodiments, the network connection status information response message can be transmitted in response to the network connection status information request message. In some embodiments, the network connection status information response message can be transmitted periodically based on the indications of the network connection status information request. In some embodiments, the network connection status information response message can be transmitted when the events indicated in network connection status information request message is detected or triggered.

In an embodiment, the network connection status information response message can include the following information in Table 6.

TABLE 5

| Information element | Status | Description |
|---|---|---|
| Result | M | Result including the current network connection status of the VAL user(s) or VAL UE(s). The response can include texture or a numerical value reflecting networking status (e.g., 0 for connection failure). |

III. Exemplary Network Monitoring Processes

Figure 5:
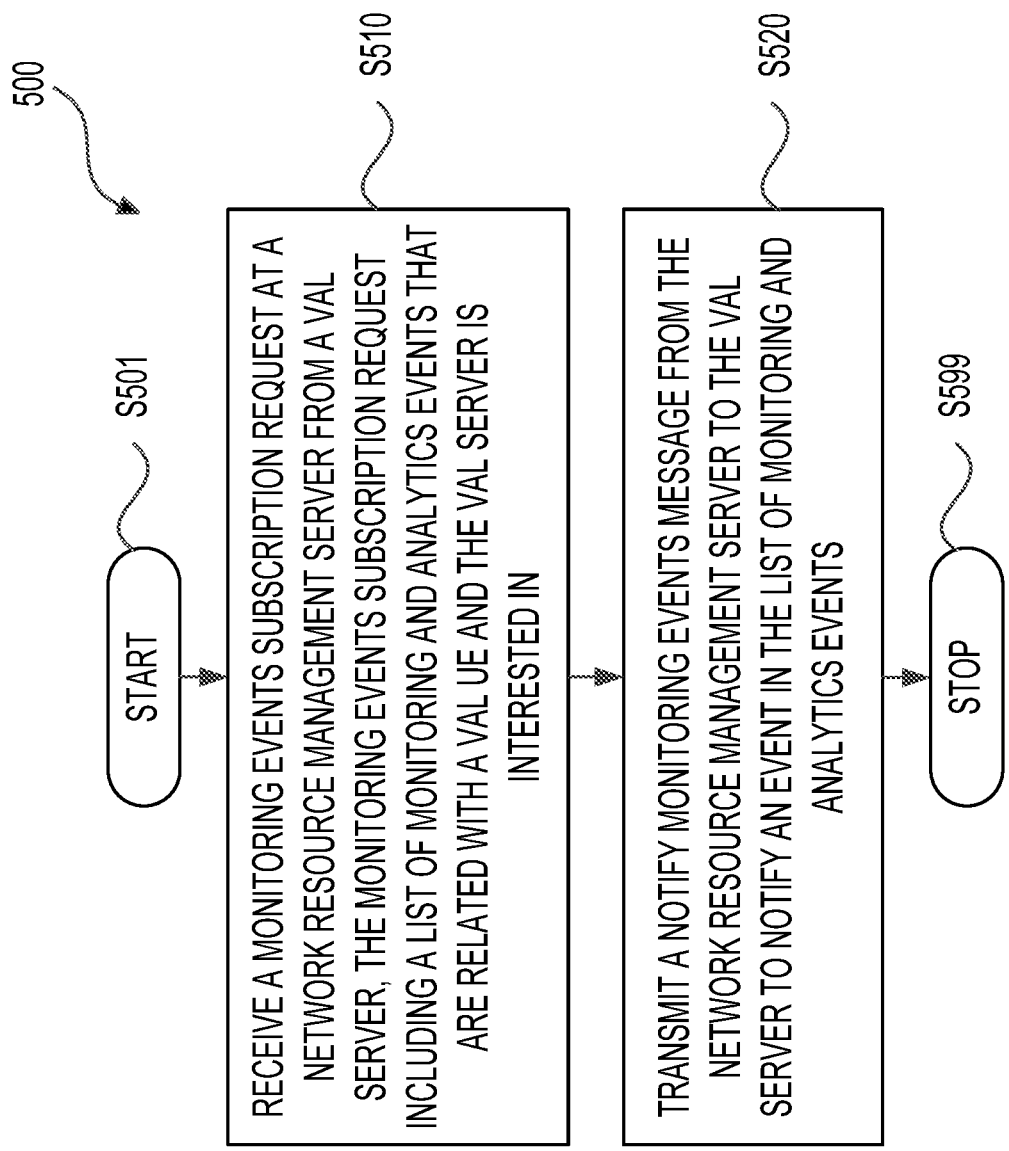
FIG. 5 shows a network monitoring process (500) according to embodiments of the disclosure.

FIG. 5 shows a network monitoring process (500) according to embodiments of the disclosure. The process (500) can be performed by a network resource management server in a SEAL. The process (500) can start from (S501) and proceed to (S510).

At (S510), a monitoring events subscription request can be received at the network resource management server in the SEAL from a VAL server. The monitoring events subscription request can include an identity of a VAL UE served by the VAL server, a list of monitoring and analytics events that are related to the VAL UE and the VAL server is interested in, and a timeout period after which a requested monitoring events subscription is ended.

In some embodiments, in response to the received monitoring events subscription request, a monitoring events subscription response can be transmitted from the network resource management server in the SEAL to the VAL server. The monitoring events subscription response can indicate a subscription status of being successful or denied.

In some embodiments, the network resource management server may subscribe to the list of monitoring and analytics events that are related to the VAL UE and the VAL server is interested in from a wireless network system. When an event in the list of monitoring and analytics events occurs in the wireless network system, the network resource management server can receive a VAL UE monitoring events notification from the wireless network system indicating the event in the list of monitoring and analytics events.

At (S520), a notify monitoring events message can be transmitted from the network resource management server in the SEAL to the VAL server to notify the event that has occurred for the VAL UE indicated in the monitoring events subscription request. For example, the notify monitoring events message can include the identity of the VAL UE served by the VAL server, the event that has occurred for the VAL UE, and a timestamp corresponding to a timing when the notified event occurs. In an embodiment, a format of the timestamp corresponding to the timing when the notified event occurs is in accordance with one of ISO 8610, RFC 1123, and coordinated universal time (UTC). The process (500) can proceed to (S599) and terminates at (S599).

Figure 6:
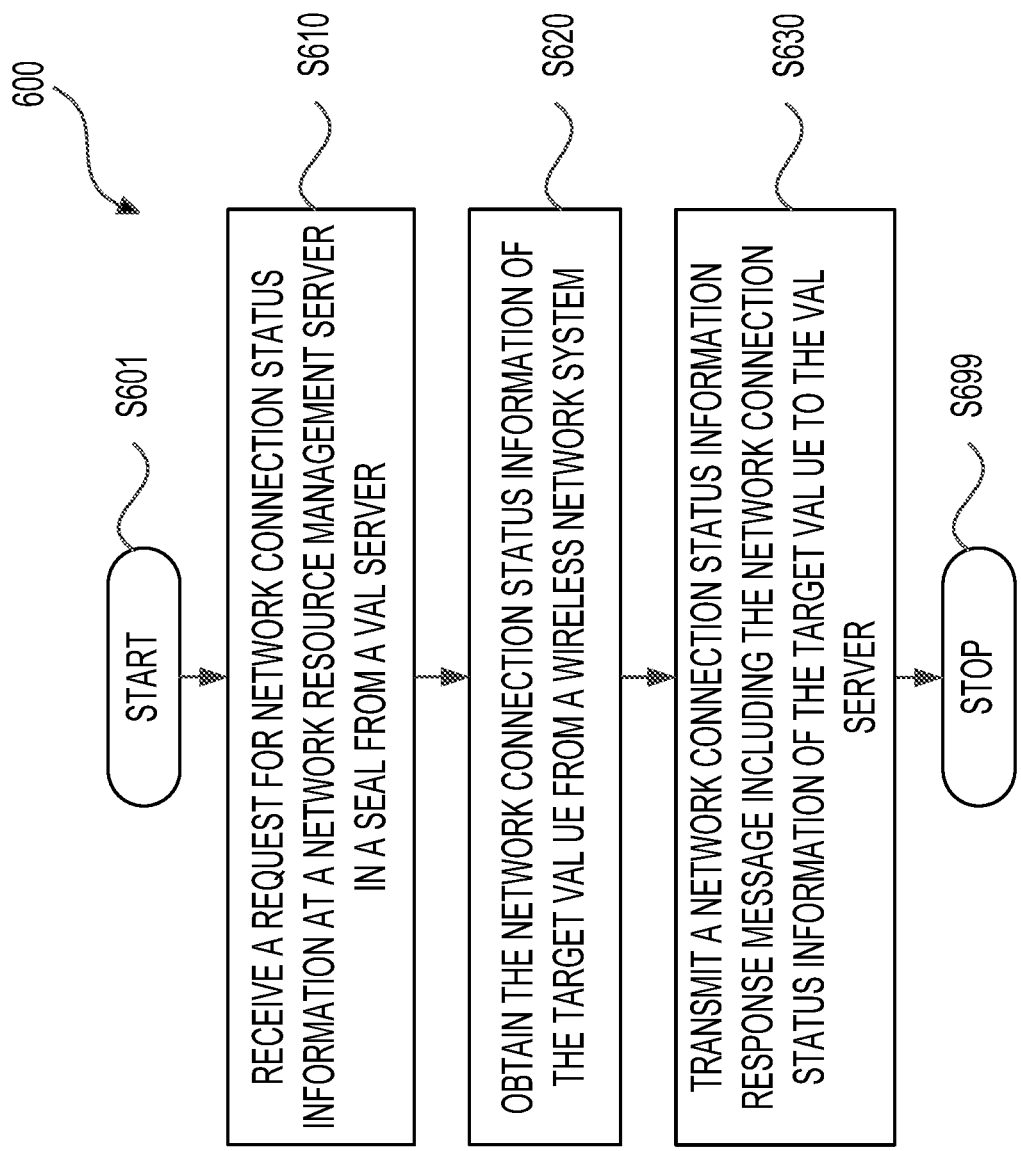
FIG. 6 shows a network monitoring process (600) according to embodiments of the disclosure.

FIG. 6 shows a network connection status querying process (600) according to some embodiments of the disclosure. A network resource management server can be configured to perform the process (600) to support a VAL server to monitor network connection status of one or more target VAL UEs served by the VAL server. The process (600) can start from (S601) and proceed to (S610).

At (S610), a request for network connection status information can be received at a network resource management server in a SEAL from a VAL server. The request for the network connection status information can indicate a target VAL UE, a type of the network connection status information, and a timeout period after which the requested network connection status information is not transmitted.

In some embodiments, the network connection status information corresponds to a monitoring event related to the target UE. The VAL server is interested in the monitoring event. The monitoring event can be detected in a wireless network system based on a predefined condition. In some embodiments, the network connection status information includes one of a loss of connection of the target VAL UE, and a connection bandwidth of the target VAL UE to the wireless network system.

In some embodiments, the request for the network connection status information includes a subscription to the type of the network connection status information. For example, the subscription indicates a frequency for providing the network connection status information from the network resource management server to the VAL server.

In some embodiment, in response to the received request for the network connection status information, a network connection status information request accept message can be transmitted from the network resource management server in the SEAL to the VAL server indicating the request for the network connection status information is authorized.

At (S620), the network connection status information of the target VAL UE can be obtained from the wireless network system through a network service exposure interface based on the request for the network connection status information.

At (S630), a network connection status information response message can be transmitted from the network resource management server in the SEAL to the VAL server. The network connection status information response message can include the network connection status information of the target VAL UE. In some embodiments, the network connection status information response message can indicate an identity of the target VAL UE, and the network connection status information of the target VAL UE. In some embodiments, the network connection status information response message can further indicate a timestamp corresponding to the network connection status information of the target VAL UE. The process (600) can proceed to (S699) and terminate at (S699).

IV. Computer System

The techniques described above can be implemented as computer software using computer-readable instructions and physically stored in one or more computer-readable media. The computer software can be coded using any suitable machine code or computer language that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
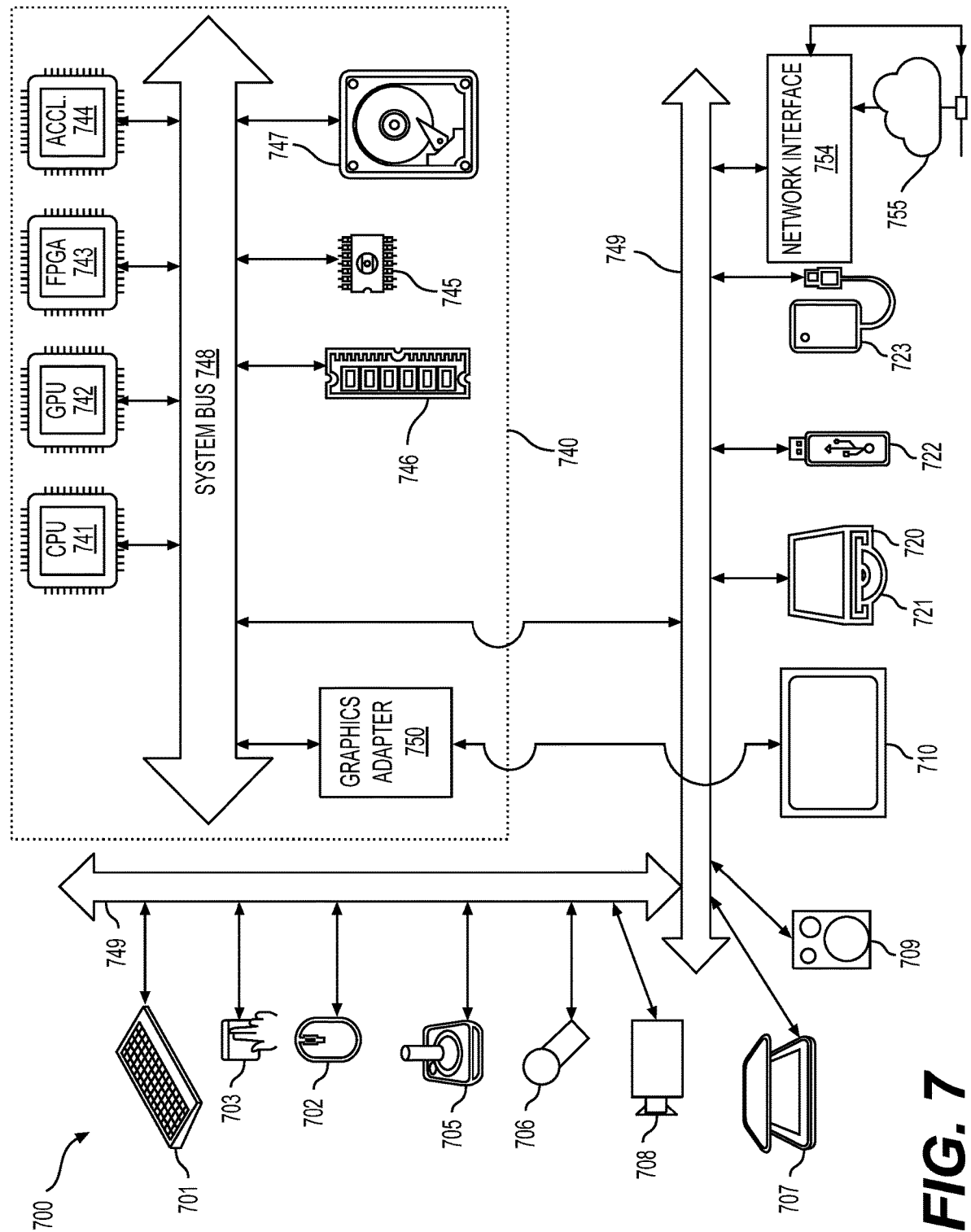
FIG. 7 is a schematic illustration of a computer system in accordance with an embodiment.

FIG. 7 shows a computer system (700) suitable for implementing certain embodiments of the disclosed subject matter. The components shown in FIG. 7 for the computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example, tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid-state drive (723), legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example, USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

The aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can be also be stored in RAM (746), whereas permanent data can be stored for example, in the internal mass storage (747). Fast storage and retrieval to any of the memory devices can be enabled through the use of cache memory, that can be closely associated with one or more CPU (741), GPU (742), mass storage (747), ROM (745), RAM (746), and the like.

The computer-readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various embodiments of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of a service enabler architecture layer (SEAL), comprising:
receiving a monitoring event subscription request for network connection status information at a network resource management server in the SEAL from a vertical application layer (VAL) server, the monitoring event subscription request for the network connection status information indicating:
a target VAL user equipment (UE),
a type of the network connection status information,
a timeout period indicating an amount of time lapsed after the monitoring event subscription request was transmitted, and
a pulling frequency for periodically providing the network connection status information;
obtaining the network connection status information of the target VAL UE from a wireless network system based on the monitoring event subscription request for the network connection status information;
transmitting a network connection status information response message including the network connection status information of the target VAL UE from the network resource management server in the SEAL to the VAL server at the pulling frequency indicated in the monitoring event subscription request; and ending transmission of the network connection status information when a current time is outside of the timeout period indicated in the monitoring event subscription request.

2. The method of claim 1, wherein the network connection status information corresponds to a monitoring event related to the target VAL UE which the VAL server is interested in and is detected in the wireless network system based on a predefined condition.

3. The method of claim 1, wherein the network connection status information includes one of:
a loss of connection of the target VAL UE, and
a connection bandwidth of the target VAL UE to the wireless network system.

4. The method of claim 1, wherein the monitoring event subscription request for the network connection status information includes a subscription to the type of the network connection status information.

5. The method of claim 4, wherein the subscription indicates the pulling frequency for periodically providing the network connection status information from the network resource management server to the VAL server.

6. The method of claim 1, wherein the network connection status information response message indicates:
an identity of the target VAL UE, and
the network connection status information of the target VAL UE.

7. The method of claim 6, wherein the network connection status information response message further indicates a timestamp corresponding to the network connection status information of the target VAL UE.

8. The method of claim 1, further comprising:
in response to the received monitoring event subscription request for the network connection status information, transmitting a network connection status information request accept message from the network resource management server in the SEAL to the VAL server indicating the monitoring event subscription request for the network connection status information is authorized.

9. A non-transitory computer-readable medium storing instructions that, when executed by a processor, cause the processor to perform a method of a service enabler architecture layer (SEAL), the method comprising:
receiving a monitoring event subscription request for network connection status information at a network resource management server in the SEAL from a vertical application layer (VAL) server, the monitoring event subscription request for the network connection status information indicating:
a target VAL user equipment (UE),
a type of the network connection status information,
a timeout period indicating an amount of time lapsed after the monitoring event subscription request was transmitted, and
a pulling frequency for periodically providing the network connection status information;
obtaining the network connection status information of the target VAL UE from a wireless network system based on the monitoring event subscription request for the network connection status information;
transmitting a network connection status information response message including the network connection status information of the target VAL UE from the network resource management server in the SEAL to the VAL server at the pulling frequency indicated in the monitoring event subscription request; and
ending transmission of the network connection status information when a current time is outside of the timeout period indicated in the monitoring event subscription request.

10. The non-transitory computer-readable medium of claim 9, wherein the network connection status information corresponds to a monitoring event related to the target VAL UE which the VAL server is interested in and is detected in the wireless network system based on a predefined condition.

11. The non-transitory computer-readable medium of claim 9, wherein the network connection status information includes one of:
a loss of connection of the target VAL UE, and
a connection bandwidth of the target VAL UE to the wireless network system.

12. The non-transitory computer-readable medium of claim 9, wherein the monitoring event subscription request for the network connection status information includes a subscription to the type of the network connection status information.

13. The non-transitory computer-readable medium of claim 12, wherein the subscription indicates the pulling frequency for periodically providing the network connection status information from the network resource management server to the VAL server.

14. The non-transitory computer-readable medium of claim 9, wherein the network connection status information response message indicates:
an identity of the target VAL UE, and
the network connection status information of the target VAL UE.

15. The non-transitory computer-readable medium of claim 14, wherein the network connection status information response message further indicates a timestamp corresponding to the network connection status information of the target VAL UE.

16. The non-transitory computer-readable medium of claim 9, wherein the method further comprises:
in response to the received monitoring event subscription request for the network connection status information, transmitting a network connection status information request accept message from the network resource management server in the SEAL to the VAL server indicating the monitoring event subscription request for the network connection status information is authorized.

17. An apparatus of a service enabler architecture layer (SEAL), comprising:
a memory; and
processing circuitry configured to cause the apparatus to
receive a monitoring event subscription request for network connection status information at a network resource management server in the SEAL from a vertical application layer (VAL) server, the monitoring event subscription request for the network connection status information indicating:
a target VAL user equipment (UE),
a type of the network connection status information,
a timeout period indicating an amount of time lapsed after the monitoring event subscription request was transmitted, and
a pulling frequency for periodically providing the network connection status information;
obtain the network connection status information of the target VAL UE from a wireless network system based on the monitoring event subscription request for the network connection status information;

transmit a network connection status information response message including the network connection status information of the target VAL UE from the network resource management server in the SEAL to the VAL server at the pulling frequency indicated in the monitoring event subscription request; and end transmission of the network connection status information when a current time is outside of the timeout period indicated in the monitoring event subscription request.

18. The apparatus of claim 17, wherein the network connection status information corresponds to a monitoring event related to the target VAL UE which the VAL server is interested in and is detected in the wireless network system based on a predefined condition.

19. The apparatus of claim 17, wherein the network connection status information includes one of:
   a loss of connection of the target VAL UE, and
   a connection bandwidth of the target VAL UE to the wireless network system.

20. The apparatus of claim 17, wherein the monitoring event subscription request for the network connection status information includes a subscription to the type of the network connection status information.

* * * * *